Figure 1:
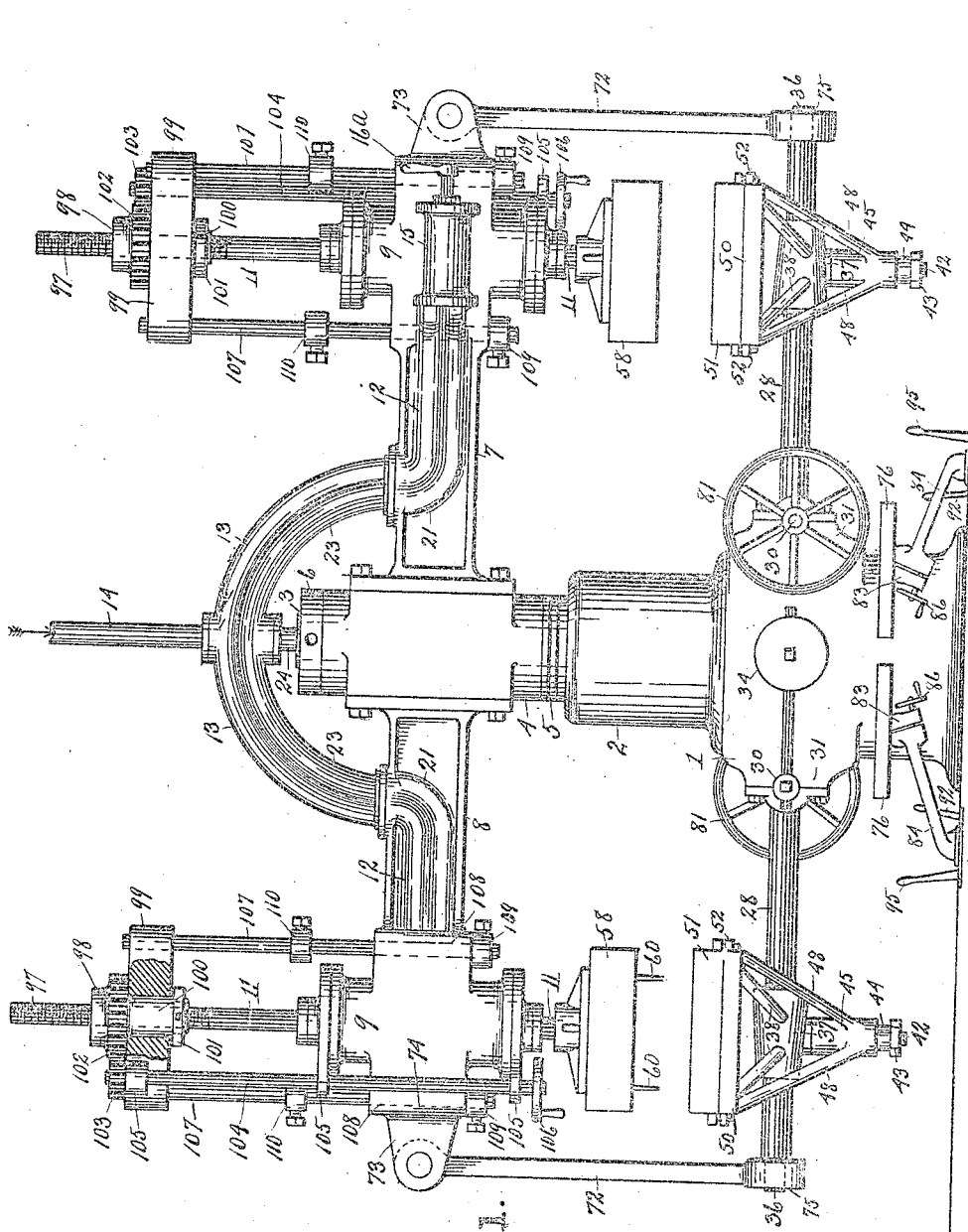

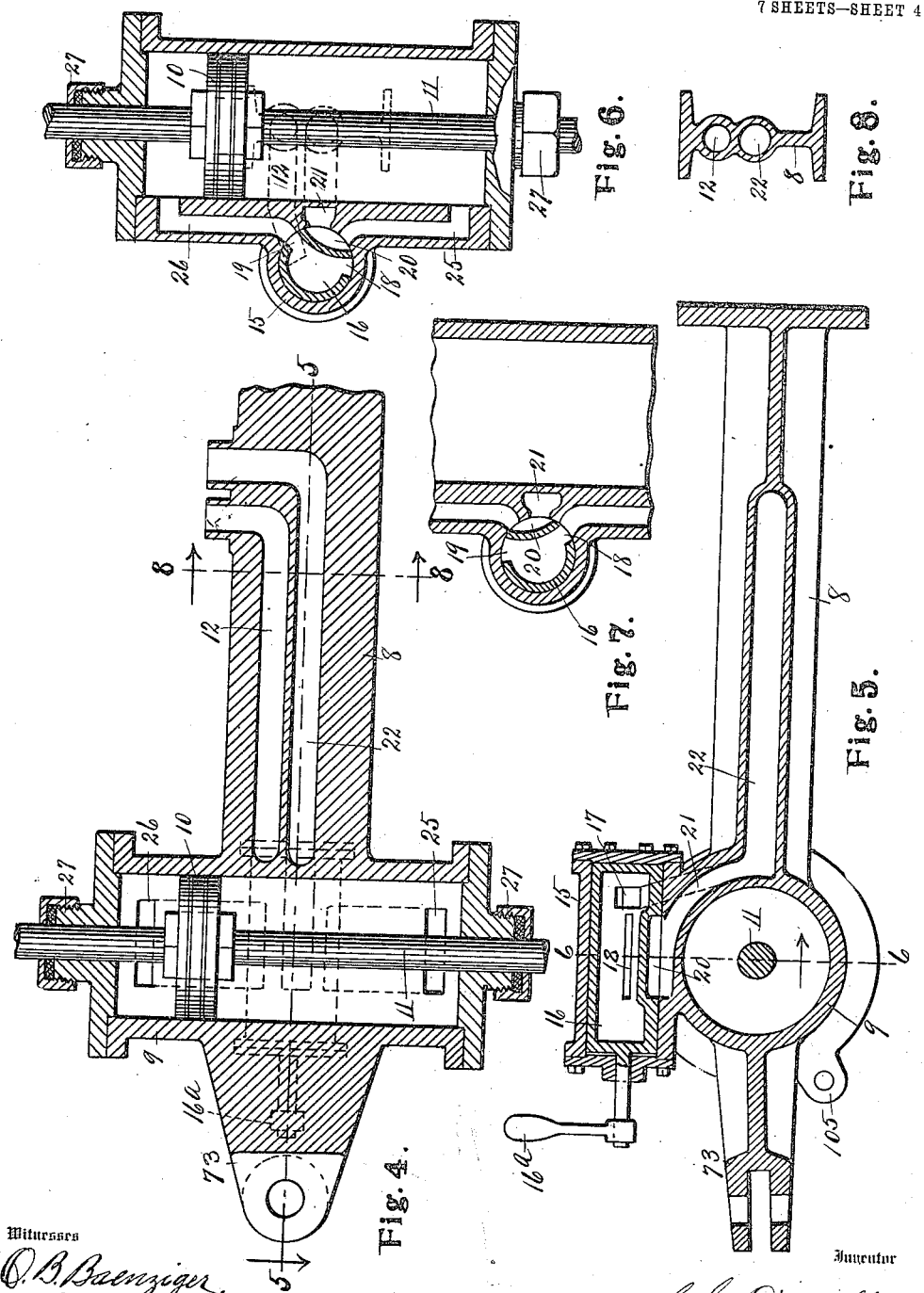

E. E. O'NEILL.
MOLDING MACHINE.
APPLICATION FILED JULY 14, 1909.
961,524.
Patented June 14, 1910.
7 SHEETS—SHEET 5.
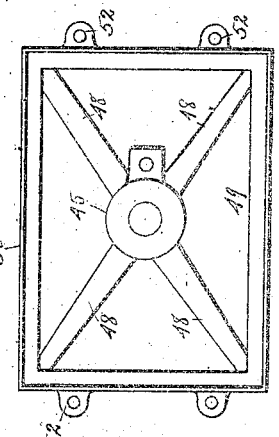
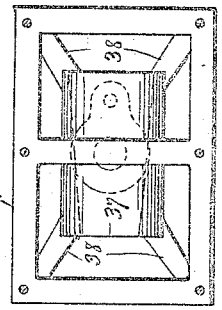
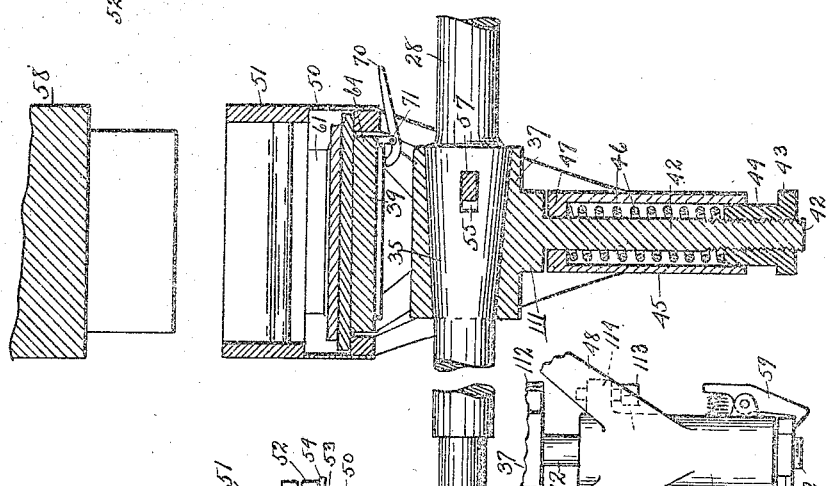
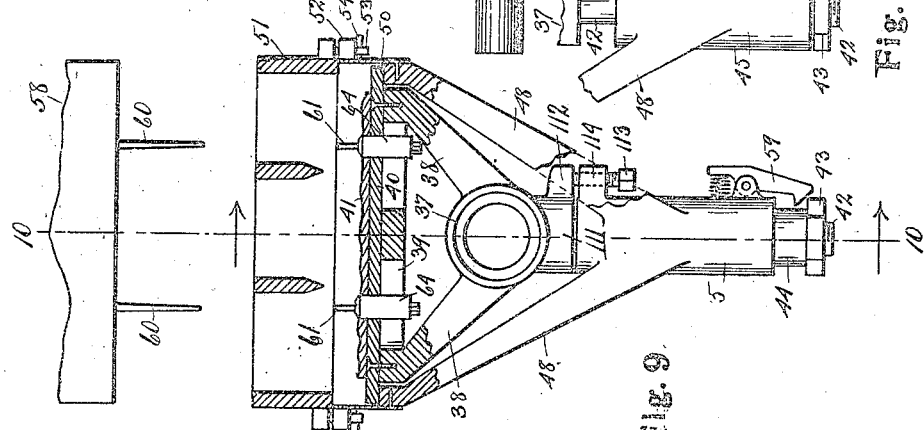
Witnesses
O. B. Baenziger.
I. G. Howlett.
Inventor
E. E. O'Neill.
By
T. H. Wheeler Jr.
Attorneys.

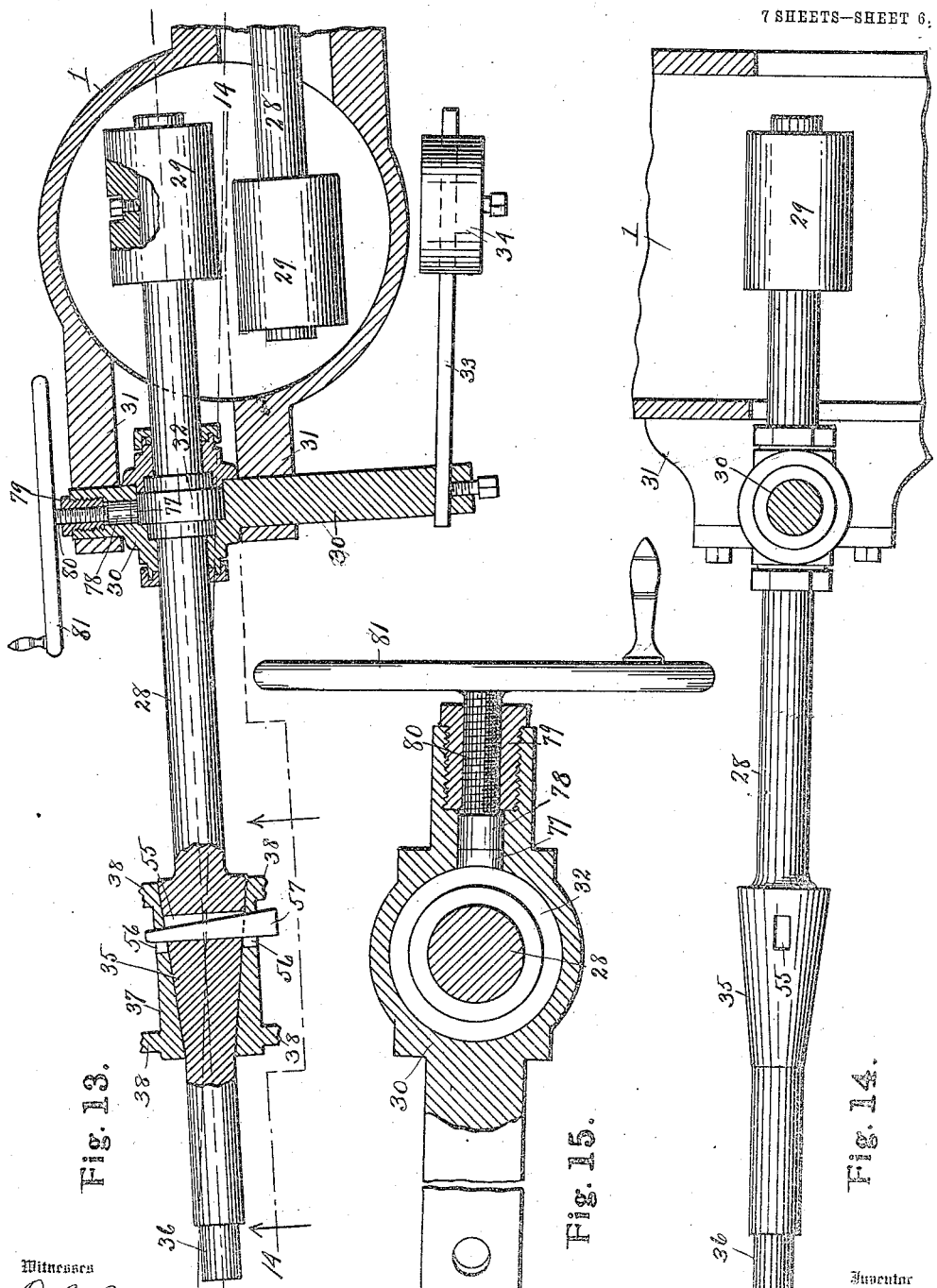

E. E. O'NEILL.
MOLDING MACHINE.
APPLICATION FILED JULY 14, 1909.

961,524.

Patented June 14, 1910.
7 SHEETS—SHEET 7.

Witnesses
O. B. Baenziger.
J. G. Howlett.

Inventor
E. E. O'Neill.
By T. A. Wheeler
Attorneys

UNITED STATES PATENT OFFICE.

EDWARD E. O'NEILL, OF SHEFFIELD, ALABAMA.

MOLDING-MACHINE.

961,524.  Specification of Letters Patent.  Patented June 14, 1910.

Application filed July 14, 1909. Serial No. 507,458.

*To all whom it may concern:*

Be it known that I, EDWARD E. O'NEILL, a citizen of the United States, residing at Sheffield, in the county of Colbert, State of Alabama, have invented certain new and useful Improvements in Molding-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a founder's molding machine especially designed for molding stove plate and similar castings, but adaptable for molding other castings.

The invention consists in the construction and arrangement of parts hereinafter more fully set forth and pointed out particularly in the claims.

The objects of the invention are to produce a machine wherein the arrangement is such as to provide for molding both halves or parts of a matched pattern at the same time; to provide for mechanically compressing the sand in the flask in the operation of molding and packing the sand under the bars of the flask as well as between said bars; to provide for tamping the sand around the sprue or ingate with the operation of compressing the sand in the flask; to provide for reversing the flask and lifting the pattern from the sand to enable the parting or facing sand to be applied to the mold or matrix and the pattern accurately reprinted; to provide for readily removing both the cope and drag after the mold has been formed and placing said parts of the flask together preparatory to casting; to provide for readily changing the pattern and its accompanying parts and for securely and accurately positioning the pattern preparatory to the operation of molding, and for insuring uniformity of thickness when casting stove plate and similar parts, wherein uniformity in the matter of thickness is desirable; to provide for regulating the travel of the pressure foot actuated by the piston in the cylinder so as to adapt the machine for any variation in the depth of the flask, accordingly as the patterns vary from which the mold is made.

A further object is to provide suitable physical structures and operative devices for the purpose of carrying out the several functions of the machine.

The above objects are attained by the mechanism illustrated in the accompanying drawings, in which:—

Figure 2:
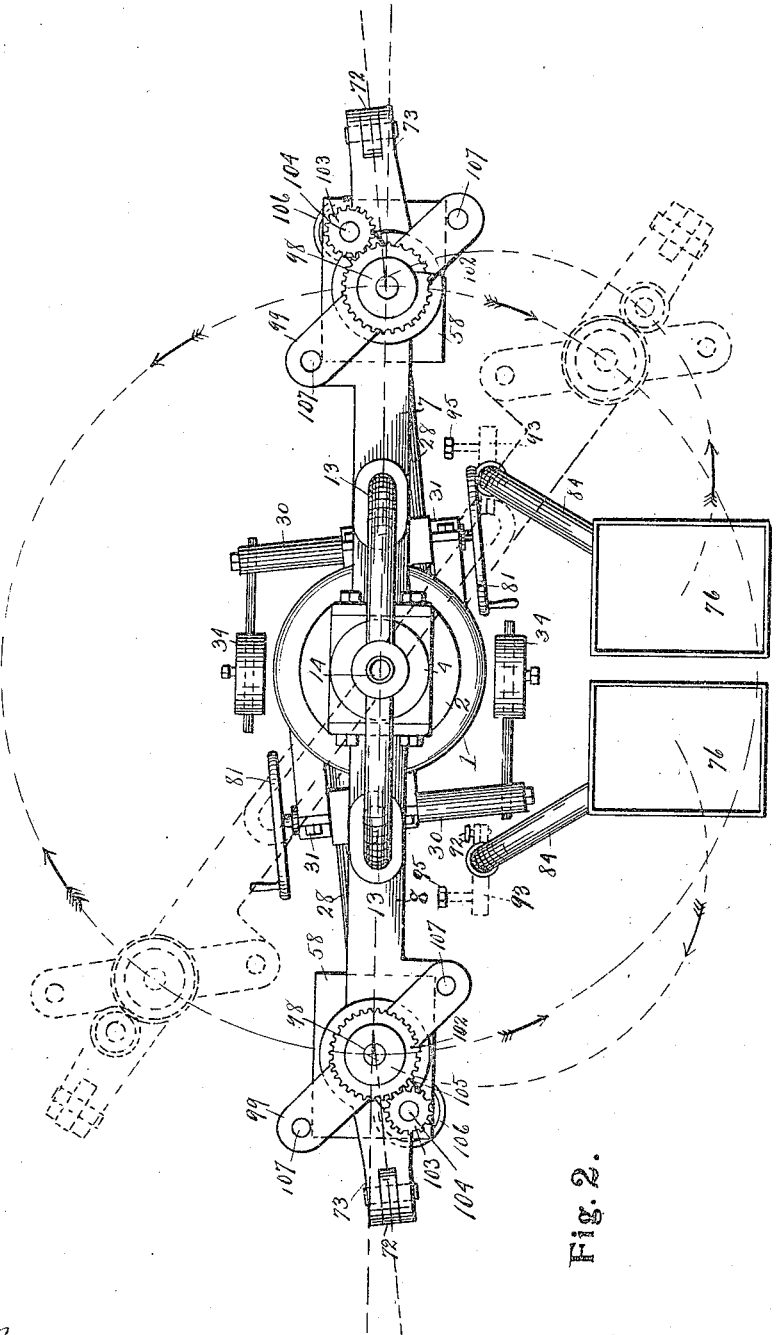
Figure 3:
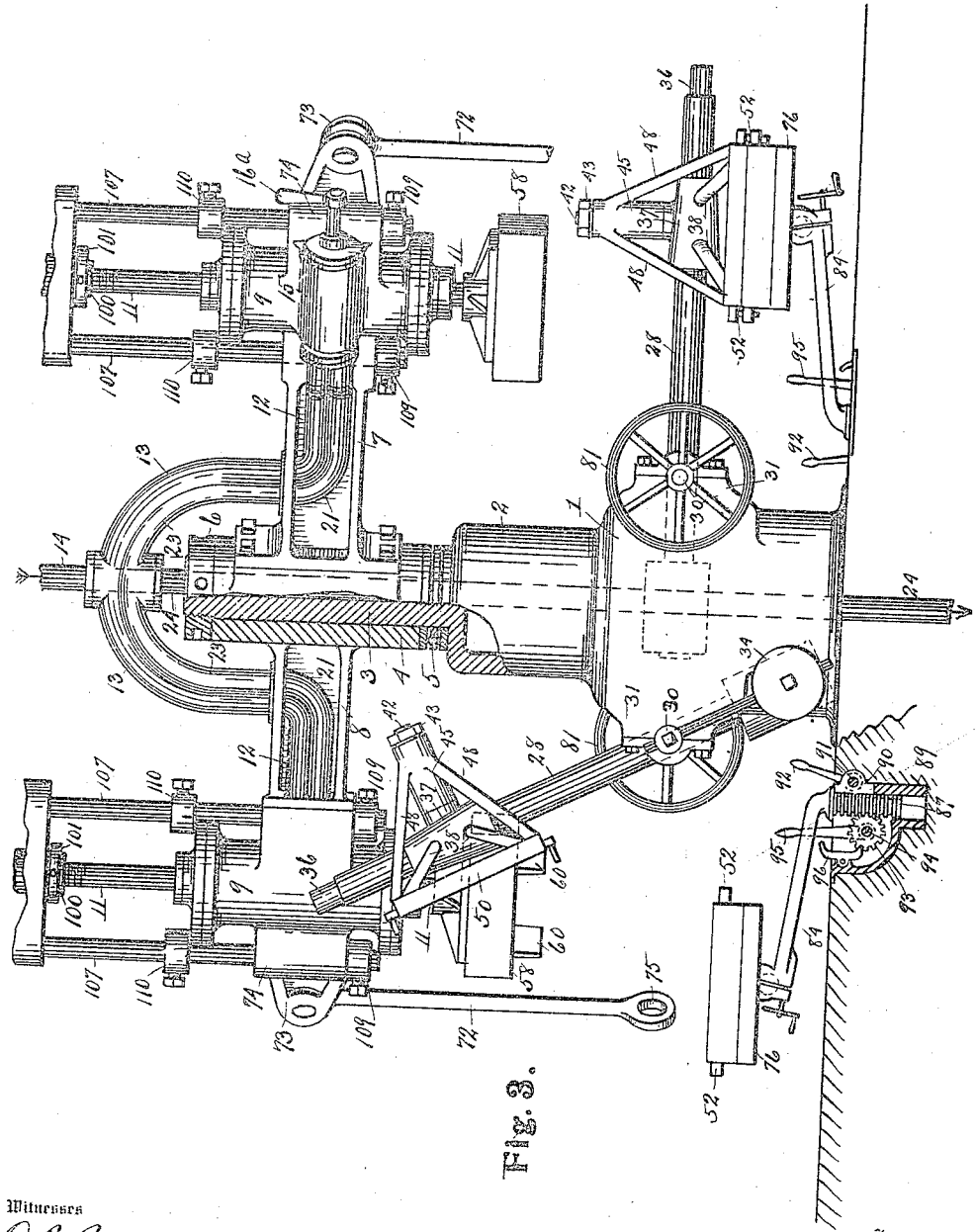
Figure 18:
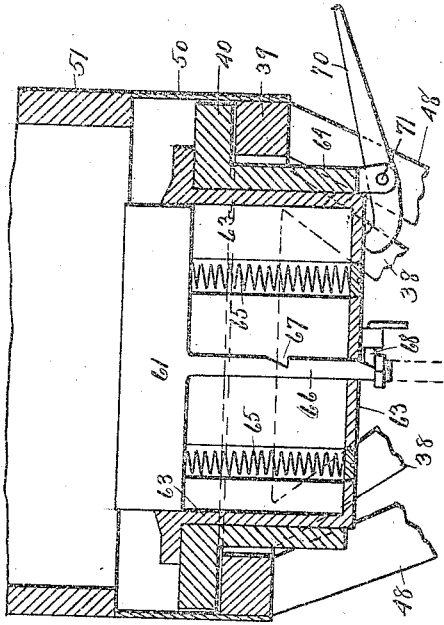
Figure 19:
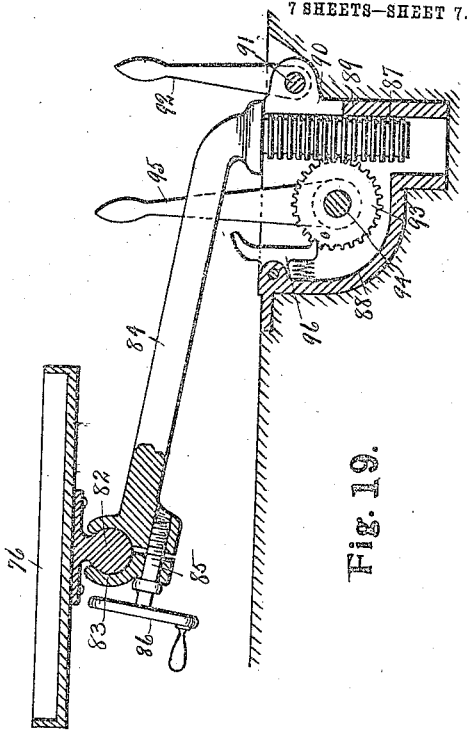
Figure 16:
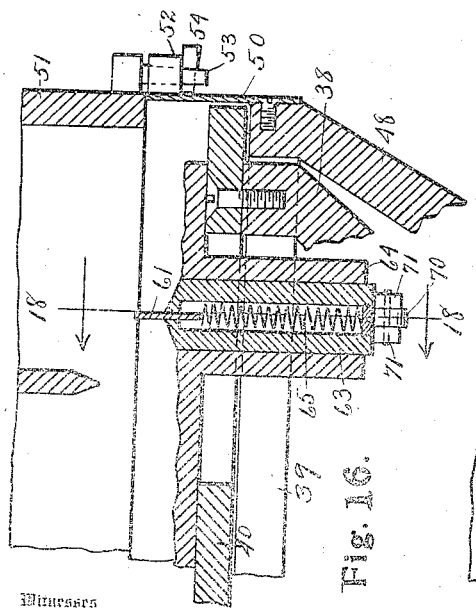
Figure 17:
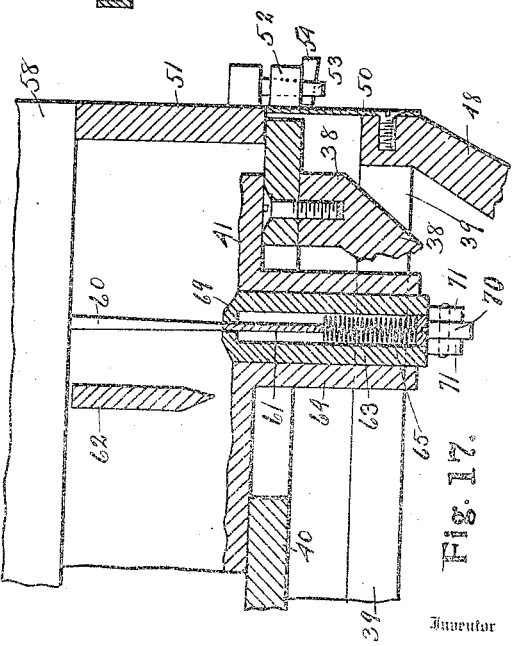

Figure 1 is an elevation of a machine embodying my invention. Fig. 2 is a plan view of Fig. 1. Fig. 3 is a view mainly in elevation, but some parts being in section to more clearly show the construction; the pivotally mounted cross-arm carrying the fluid pressure cylinders being swung to permit of the elevating of the shaft carrying the pattern, for the purpose of lifting the pattern from the sand, the part of the flask carrying the mold or matrix being supported on a movable table. Fig. 4 is an enlarged longitudinal section through one end of the cross arm and a vertical section through the cylinder carried at the end thereof, the piston within the cylinder and the piston rod or plunger appearing in elevation. Fig. 5 is a horizontal section as on line 5—5 of Fig. 4. Fig. 6 is a sectional view through the cylinder and the valve case and valve controlling the ports thereof, as on line 6—6 of Fig. 5. Fig. 7 is a fragmentary view in section through the cylinder and valve case, showing a position of the valve different from that shown in Fig. 6. Fig. 8 is a transverse section through the cross-arm and the ways therein, as on line 8—8 of Fig. 4. Fig. 9 is an enlarged detail partly in section of the pattern set, showing a set of detachable parts comprising the follow-board or plate carrying the pattern supported on a rectangular frame carried by radial arms extending from the hub, also showing a vertically reciprocatory shell mounted upon a rectangular frame embracing the frame carrying the pattern and supported by radial arms extending from a vertically movable sleeve slidably mounted on a stem depending from said hub. A part of a flask is supported upon said shell and above the flask is a pressure foot carrying the gates which form the sprues or ingate openings. Fig. 10 is a sectional view as on line 10—10 of Fig. 9, the supporting shaft and tapered spindle thereon appearing in elevation. Fig. 11 is a plan view of the frame carrying the shell which supports the flask. Fig. 12 is a plan view of the frame which supports the follow-board or plate on which the pattern is mounted. Fig. 13 is an enlarged horizontal section through the base or pedestal of the machine showing in elevation one of the tilting shafts and the bearing therefor, the other shaft and a portion of the base being broken away. Fig. 14 is a sectional view on line 14—14 of Fig. 13. Fig. 15 is an enlarged fragmentary view longitudinally of the trunnion bearing in which the tilting shafts are rotatively seated and transversely of said shaft showing the manner of locking the shaft against rotation. Fig. 16 is an enlarged fragmentary view in section through a portion of the parts associated with the follow-board and pattern, showing a complementary part of the gate resiliently mounted in the pattern to recede when engaged by the portion of the gate carried by the pressure foot as said foot descends to compress the sand in the flask in the operation of molding. Fig. 17 is a similar section, showing how the portion of the gate carried in the pattern recedes, and the position of the parts when the pressure foot shall have reached the limit of its downward stroke. Fig. 18 is a fragmentary view in section on line 18—18 of Fig. 16, illustrating the latch which locks down the resilient portion of the gate carried by the pattern, and showing the means for tamping the sand firmly around the ingate opening and for beveling said opening to allow the metal to flow freely into the mold. Fig. 19 is an enlarged view in section showing one of the swinging tables, the provision for raising and lowering said table, the provision for tilting it upon its supporting arm and the means for locking it in position. Fig. 20 is a fragmentary view illustrating the position of the sleeve carrying the movable shell which embraces the follow-board and pattern when locked down.

Referring to the characters of reference, 1 designates the hollow pedestal of the machine, the upper portion 2 of which is reduced in diameter and supports the centrally disposed vertically extending column 3. Embracing said column and rotatable thereon is a hollow shaft or sleeve 4 supported upon a ball bearing 5 and confined by a nut or collar 6 which is screwed onto the upper end of the column 3. Secured to and projecting laterally from opposite sides of the sleeve 4 in axial alinement, are the arms 7 and 8 respectively, each of which carries at its outer end a pressure cylinder 9 having therein a piston head, as shown in Figs. 4 and 6, mounted upon a piston rod or plunger 11. In each of the arms 7 and 8 is an induct passage 12 which communicates at its outer end with a curved pipe 13 in turn communicating with a supply pipe 14 leading from a source of fluid under pressure, not shown. Water is preferred as the medium for operating the pistons of the cylinders, but other fluids under pressure may be employed, if desired. The passage 12 in each of said arms is continued through the wall of the cylinder into one end of the valve case 15 carried by each of said cylinders and having therein a rotary cylindrical valve 16 actuated through the medium of a handle 16ª attached to the outer end of its stem and provided with an induct port 17, which is always in communication with the passage 12; whereby the interior of said valve is kept constantly filled with fluid under pressure. Formed through the wall of each of said valves is an educt port 18, and nearly opposite the port 18 is a second educt port 19. In the outer face of the circular wall of each of the valves on the side adjacent its cylinder is a by-pass 20 which has no communication with the interior of said valve, but which is always in communication with a way 21 in the cylinder wall which in turn communicates with the exhaust passage 22 in the arm supporting said cylinder. These exhaust passages in said arms are connected through the curved pipe sections 23 with the central exhaust pipe 24 which extends downwardly through the pedestal of the machine or which may be caused to discharge at any convenient point. Formed in the wall of each of the cylinders are the vertical passages 25 and 26, as shown in Fig. 6. The upper passage 26 in each cylinder connects the valve case with the interior of the cylinder at its upper end, while the lower passage 25 in each cylinder connects the valve case with the interior of the cylinder at its lower end. By a rotary movement of the valve 16, the interior of said valve may be caused to successively communicate through the ports 18 and 19 with the passages 25 and 26 to successively introduce fluid under pressure through said valve into the opposite ends of the cylinder for the purpose of actuating the piston therein, at the same time the movement of said valve will cause said passages 25 and 26 to successively register through the by-pass 20 with the way 21 leading to the exhaust. By this arrangement when water under pressure is admitted to one end of the cylinder, the opposite end of the cylinder is made to communicate with the exhaust pipe so that the water which has previously filled the cylinder may be allowed to escape without impeding the movement of the piston. At the opposite end of each of the cylinders is a stuffing box 27 around the plunger 11 to prevent leakage.

Mounted in the base or pedestal of the machine and projecting therefrom in opposite directions are the shafts 28. These shafts are offset so that they are out of alinement and the inner ends thereof extend by each other within the base and lie in parallel relation. Mounted upon the inner ends of said shafts within the hollow pedestal are the weights 29 which serve to counterbalance said shafts. Each of the shafts 28 is supported to rotate in a trunnion 30 mounted in bearing brackets 31 extending from the base or pedestal. Said shafts while made rotatable in the trunnions 30 are held from longitudinal movement therethrough by means of the bearing rings or collars 32 thereon which are rotatively seated in the enlarged portions of said trunnions, as clearly shown in Fig. 13. By this arrangement the shafts 28 may be rotated about their axis and may be swung in the arc of a circle concentric with the axis of the trunnions 30. Each of the trunnions 30 is provided with an extended end having secured therein a horizontal arm 33 upon which is mounted an adjustable weight 34. These weights 34 are in the nature of auxiliary counterweights operating in conjunction with the weights 29 to balance the shafts 28, said weights 34 being outside of the pedestal may be readily adjusted on the arms 33 accordingly as the parts carried by the outer ends of the shafts 28 may vary in weight from time to time.

Each of the shafts 28 near its outer end is provided with a tapered spindle 35 and at its extreme end with a tenon 36. Adapted to fit on the spindle 35 is a hub 37 having a tapered bore therein to receive said spindle. Extending upwardly and outwardly from said hub are four diverging arms 38 which are connected at their upper ends to a rectangular frame 39 (see Figs. 9 to 12 inclusive). Supported upon said frame 39 is the plate 40 upon which one part of a matched pattern 41 is mounted. Depending from the underside of the hub 37 is the stem 42, the lower end of which is threaded to receive a nut 43 provided with an extension 44. Mounted upon the stem 42 and embracing at its lower end the extension of said nut to slide vertically thereon is a sleeve 45. Interposed between the stem 42 and the wall of the sleeve 45 and embracing said stem is a coiled spring 46 which is confined between the extension of the nut 43 and a shoulder 47 at the upper end of said sleeve, whereby said sleeve becomes mounted upon the stem 42 to slid vertically and is yieldingly held in its normal position by the tension of said spring. Extending upwardly and outwardly from the sleeve 45 are the four diverging brace arms 48 which at their upper ends are connected to and support a rectangular frame 49. Attached to and projecting upwardly from the frame 49 is a rectangular shell 50 which embraces the pattern plate 40 and is adapted to support on its upper edge one part 51 of a two-part flask. Projecting from the upper margin of the shell 50 are ears 52 adapted to receive the pins 53 carried by the flask, said parts being secured together by driving keys 54 through the ends of said pins.

Where the molding is being done from a matched pattern, there is a pattern set for each of the shafts 28, the arrangement being such as to enable the two parts of the pattern to be molded at the same time, and provision being made for molding one part of the pattern in the cope of the flask and the other part in the drag, the two parts of the flask after the operation of molding, being placed together as hereinafter described, after which the flask is removed preparatory to pouring. A pattern set comprises the hub 37, a pattern plate and pattern supported by the arms 38 extending from said hub, the shell 50 carried by the frame 49 supported by the arms 48, and the spring mounted sleeve on the stem of said hub to which the arms 48 are connected. A pattern set when desired for use is placed upon the shaft 28 so that the tapered spindle 35 on said shaft will enter the hub 37 so as to cause the transverse aperture 55 through said spindle to register with the transverse apertures 56 (see Fig. 13) through the opposite walls of said hub, to enable a key 57 to be driven through said registering apertures to securely lock the hub to the spindle, the arrangement of parts being such, that, when the hub is so secured to the shaft, the pattern plate and embracing shell shall be presented upwardly to lie in a horizontal plane. When the pattern set is in position upon the shaft 28 it will be supported directly under the pressure foot 58 secured to the lower end of the piston rod or plunger 11, so that when the flask is placed in position upon the pattern set and the requisite amount of sand placed therein, the pressure foot may be caused to descend onto the flask through the operation of the piston in the cylinder and compress the sand therein so as to cause it to compactly fill the flask and perfectly impress the pattern in the sand.

In the making of large castings, such as stove plate, it is necessary to employ crossbars 62 in the flask in order to enable the sand to be compacted between said bars sufficiently to maintain it firmly in the flask. In hand molding it has been difficult to tuck or tamp the sand under the bars with sufficient pressure to retain it in the cope of the flask and obviate the liability of sagging when the flask is inverted and the casting poured. By means of this machine the sand is made as compact under the bars as at any other point in the flask owing to the fact that pressure is applied to the sand in the flask equally from the top and bottom during the operation of molding, a result attained by reason of the vertically movable shell 50 and the immovable pattern plate 40 over which said shell slides, the operation of which may be described as follows:—The parts being in the position shown in Figs. 9, 10 and 16, and the flask being filled with sand, the descent of the pressure foot 58 will cause said foot to engage the upper edge of the flask and as said foot continues to descend, to carry said flask downwardly, the shell 51 sliding downwardly over the plate 40 and the sand being compressed in the flask between said plate and the under face of the pressure foot and around the pattern 41 mounted on said plate. As said shell moves downwardly, the arms 48 connected to the frame 39 to which said shell is attached are forced down, thereby causing the sleeve 45 to slide downwardly upon the stem of the hub 37 against the action of the spring 46. When said parts shall have reached the limit of their downward movement, the spring actuated detent 59 pivoted to the lower end of said sleeve will hook under the nut 43 on the end of the stem 42 and lock the sleeve down, as clearly shown in Fig. 20, Sheet 5; the relative position of the shell, pattern plate, flask and pressure foot when the parts are so locked, being shown in Fig. 17. It will be noted that the sand which occupied the shell and flask at the inception of the downward movement of the pressure foot, is at the completion of said downward movement, compressed within the space of the flask itself, and that the pattern carried by the plate 40 is firmly impressed in the sand of the flask. In order to afford a sprue or ingate opening through the sand in the cope of the flask which shall communicate with the mold of the pattern, one or more two-part gates are provided, the part 60 thereof being secured to the under face of the pressure foot 58 adapted to pierce the sand in the flask as said foot descends. Projecting vertically from the pattern is a complementary portion of said gate which is in vertical alinement with the part 60. The part 61 of the gate is mounted to slide vertically in a hollow bushing 63 movably mounted in a housing 64 depending from the pattern 41 through the plate 40, said complementary part 61 of the gate being mounted upon compressible springs 65 and having a central stem 66 (see Fig. 18) which passes through the bottom of the bushing 63 and is notched at 67 to provide an engaging shoulder for a locking dog 68 mounted on the bottom of said bushing. When the portion 60 of the gate moves downward with the movement of the foot 58, it engages the upper edge of the lower portion 61 and causes said lower portion to slide downward within the bushing against the action of the spring 65 so that at the completion of the downward movement of the pressure foot the complementary portion 61 of the gate will have been carried entirely within the bushing, as shown in Fig. 17, in which position it will be locked by the engagement of the dog 68 in the notch 67 of the stem of said part. By employing the two-part gate as described, a clean and perfect ingate opening is formed through the sand in the flask and rupturing of the wall of said opening is avoided. In order to increase the area of the sprue or ingate opening at its point of communication with the mold so that the molten metal when poured will flow readily into the imprint of the pattern, the bushing 63 is provided with a conical or beveled upper end 69 and said bushing is made vertically movable in the embracing housing 64. Said beveled upper end of the bushing increases the area of the sprue opening and by striking upon the outer end of the lever 70 (see Fig. 18) which is pivoted at 71 to one end of the housing 64, and the inner end of which engages the bottom 63 of the bushing, said lever will force the bushing upwardly and tamp the sand surrounding the beveled upper end thereof so as to harden the wall of the sprue opening where it communicates with the mold, preventing the breaking of said wall when the metal is poured.

In order to sustain the outer ends of the shafts 28 at the time of the application of pressure to the sand in the flask, the links 72 are employed which are pivotally hung at their upper ends from ears 73 carried by the brackets 74 of the cylinders. The lower ends of the links 72 are provided with eyes 75 adapted to freely receive the tenons 36 on the ends of the shafts 28 and firmly support said shafts during the operation of compressing the sand and imprinting the pattern.

After the sand shall have been compressed in the flask to imprint the pattern therein, it is necessary to lift the pattern from the sand in order to enable the imprint or matrix to be dusted with facing sand, and it is also necessary to reprint the pattern in the mold to level or compress the facing sand in order that the casting may have a smooth face. To accomplish these results, the shaft 28 is rotated around its longitudinal axis on its bearing in the trunnion 30 so as to present the flask downwardly. A swinging table 76 is then moved under the flask to the position shown at the left of Fig. 3, so that the flask will rest thereon. The link 72 is then disengaged from the tenon at the end of the shaft 28 and the cross arm swung upon the ball bearing 5 so as to carry the pressure foot out of alinement with the pattern set on the shaft 28. The shell 50 of the pattern set is then disengaged from the flask and the pattern lifted from the sand by raising the outer end of the shaft 28, which to accommodate this movement swings upon its trunnion 30, as shown at the left of Fig. 3, leaving exposed the mold or matrix in the sand of the flask which may then be sprinkled with facing sand and the pattern again reprinted therein by swinging downwardly the outer end of the shaft 28 so as to return the pattern to its original position in the sand, thereby smoothing the facing sand and pressing it into the mold after which the pattern is again lifted from the mold by raising the shaft 28, as before described. Where molding is being done simultaneously at opposite ends of the machine from matched patterns, the operations just described take place concurrently, so that after the patterns have been reprinted, to smooth the facing sand the tables 36, of which there is one for each end of the machine, are swung inwardly or toward each other so as to bring them side by side, as shown in Fig. 2, when the cope of the flask is placed upon the drag and said parts properly secured, after which the flask is removed to the point where the casting is being done.

In order to reprint the pattern accurately in the mold of the sand after it is lifted therefrom for the purpose of applying the facing sand to the mold, it is necessary to hold the shaft 28 during said operation against rotary movement. This is accomplished by forming a longitudinal opening in one end of the trunnion 30 which communicates with the bearing ring 32 on said shaft and in which is placed a brake block of lead 77 which is backed by a plug 78 of steel. Screwed into the end of said trunnion is a bushing 79 through which passes a screw 80 adapted to be turned by a hand wheel 81. Said screw engages the plug of steel and forces it against the block of lead, whereby said lead is crowded with such force against the ring 32 as to hold the shaft 28 from turning. When it is desired to rotate the shaft, it is only necessary to release the screw 80 when said shaft may be readily turned. By this means the shaft may be securely locked against rotation when swinging upon the trunnion 30 through which it passes, whereby the pattern when lifted from the sand may be accurately reprinted in the mold or matrix formed therein.

The tables 76 adapted to support the flasks are each provided on the under side thereof with a depending ball 82 (see Fig. 19) adapted to fit into a split socket 83 on the outer end of the upwardly inclined supporting arm 84. A screw 85 passing through the divided members of the socket 83 and actuated by a hand wheel 86 enables the parts of the socket to be firmly clamped upon the ball to lock the table against tilting. The lower end of each of the arms 84 that support the tables 76 is provided with a downwardly extending cylindrical rack 87 which depends within a housing 88 having a portion 89 which embraces said rack, said embracing portion being split, as at 90, and a screw being passed through the split portions actuated by a lever 92, whereby the portion of the housing embracing the rack, may be clamped thereon to lock the arm 84 against turning. Engaging the rack 87 within said housing is a pinion 93 carried on the shaft 94 to which is attached the lever 95. By a manipulation of said lever the rack 87 may be raised or lowered to impart a like movement to the arm 84 and the tables 76 carried thereby. For the purpose of locking the pinion 93 so as to sustain the table 76 at any elevation without clamping the rack 87, a spring-actuated dog 96 is employed which is pivoted in said housing and engages the teeth of said pinion. When the table has been elevated to the desired height through the manipulation of the lever 95, the dog will lock the pinion 93 against backward movement, thereby supporting the rack 87 which serves as a pivotal bearing on which the arm 84 and table 76 may swing.

Because of the fact that the flasks vary in depth accordingly as the castings being made change in character, it is necessary to provide for regulating the travel of the pressure feet 58 of the respective cylinders. To accomplish this result, the piston rod or plunger 11 of each cylinder is threaded at its upper end, as shown at 97 in Fig. 1, and is screwed through a nut 98 rotatively seated on the cross-head 99 and having a hub 100 passing through said cross-head and receives a collar 101 to cause the nut and cross-head to travel together and permit said nut to rotate. The periphery of the nut is provided with gear teeth 102 which mesh with a pinion 103 on the upper end of the shaft 104, said shaft passing through guides 105 and carrying at its lower end a hand wheel 106 by means of which it may be rotated, and being adapted to slide vertically through said guides with the travel of the cross-head 99. To guide the cross-head in its vertical movement, it is provided with depending guide rods 107 fixed at their upper ends in said cross-head and adapted to slide vertically through the guides 108 cast upon the walls of the cylinder. Upon the lower ends of said rods are the set collars 109 and upon said rods above the guides are the set collars 110. The guide rods 107 travel with the cross-head and the set collars 109 and 110 thereon limit the travel of said parts, which, by an adjustment of said collars may be regulated. To raise or lower the pressure foot 58, the shaft 104 is revolved to turn the nut 98 and raise or lower the plunger 11 to the lower end of which said foot is attached. By means of these features of adjustment, the machine may be set for any character of work and the travel of the pressure foot regulated as may be desired.

In a general sense the operation of the machine may be described as follows:—Pattern sets of the work to be produced are mounted upon the shafts 28 and the cope and drag of the flask placed upon said sets respectively, as shown in Fig. 1. The links 72 are engaged over the tenons at the ends of said shafts and after the flasks shall have been filled with sand, the controlling valves 16 are actuated, as before described, to cause fluid under pressure to enter the upper ends of the cylinders and force the pistons downwardly, causing the pressure feet 58 to compress the sand in the flasks. After this operation the valves 16 are actuated to cause fluid under pressure to enter the lower ends of the cylinders and raise the pressure feet, the fluid which fills the cylinders escaping through said valves and the exhaust passages, as previously explained. The shafts 28, which up to this point have been locked against rotation, are now unlocked by loosening the screws 80, and said shafts are rotated so as to swing the flasks downwardly onto the tables 76 which have been previously swung into position thereunder. The shafts 28 are again locked against rotation and the tables rigidly secured in position to support the flasks, which are then disengaged from the pattern sets. The supporting links 72 are then detached from the ends of the shafts 28, when the cylinders are swung upon the bearing 5 to carry them out of the path of travel of said pivoted shafts, and said shafts are swung upwardly to carry the patterns from the sand, as shown at the left of Fig. 3, the flasks remaining in position upon said tables. After the application of the facing sand to the mold, the patterns are reprinted therein by returning the shafts 28 to their normal position after which said shafts are again raised to carry the patterns from the molds and the tables 76 are swung together, as shown in Fig. 2 when the cope and drag of the flask are placed together in their proper relative position and secured in the ordinary manner, after which the flask containing the completed mold is removed and conveyed in any suitable manner to the place where the castings are made. The shafts 28 are then swung downwardly to a horizontal position and the arms 7 and 8 carrying the cylinders are swung upon their vertical axis to bring the links 72 again into alinement with the ends of the shafts 28 which are entered in the eyes of said links to again support the outer ends of said shafts which are unlocked and rotated to present the pattern sets uppermost and again locked to secure the parts in position. The dogs 68 are tripped to permit the pattern portions of the gates 61 to return to their normal positions and the detents 59 are tripped to permit the shells 50 of the pattern sets to rise to a position to receive the parts of the flask, when the operation of molding may be repeated, as will be well understood in the art. When it is desired to lower the tables 76 that support the parts of the flask, the dogs 96 are tripped to release the pinion 93 when said tables may be lowered by a movement of the lever 95.

It will be noted that the height at which the shell 50 stands above or in relation to the pattern plate, determines the quantity of sand held by the shell and flask and which is compressed into the flask by the descent of the foot 58. To regulate the height at which said shell shall stand above the pattern plate, there is employed upon the boss 111 (see Figs. 9 and 10) of the hub 37, a laterally extending abutment 112 adapted to be engaged by a set screw 113 threaded in and passing through an ear 114 on the sleeve 45. As the sleeve 45 rises after being depressed, its upward travel is arrested by engagement of said screw with said abutment. By adjusting said screw through the ear 114, the upward travel of said sleeve may be regulated to vary the height which the shell 50 shall stand above the pattern plate preparatory to the operation of molding, thereby varying accordingly the quantity of sand which may be held by said shell and flask.

Having thus fully set forth my invention, what I claim as new and desire to secure by Letters Patent, is:—

1. A molding machine comprising a pattern set containing a pattern to be molded, and having means for supporting a flask, a movable support carrying the pattern set, said support being actuatable to revolve the pattern set and to raise the pattern from the sand in the flask, an actuatable foot adapted to compress the sand in the flask, means for permitting said foot to swing in the arc of a horizontal circle, and means for actuating said foot vertically.

2. A molding machine comprising a pattern set containing the pattern to be molded and having means for supporting a flask, means for supporting the pattern set adapted to normally maintain said set uppermost on said support, said pattern set support being actuatable to permit the pattern set and flask to swing downwardly and being also actuatable to permit the pattern to be lifted from the sand in the flask, a pressure foot adapted to compress the sand in the flask, and means for permitting said foot to be swung out of the path of travel of the pattern set to permit the pattern to be swung upwardly.

3. A molding machine comprising a pattern set containing a pattern and having means for supporting a flask, a shaft upon which said pattern set is removably mounted, said shaft being rotatably and also pivotally mounted, a pressure foot adapted to compress the sand in the flask and around the pattern, means for reciprocating said foot, and means for permitting said foot to be swung from its position over the pattern set and flask.

4. A molding machine comprising a reciprocatory plunger having a pressure foot thereon, means for actuating said plunger, a pattern supported below said foot, means associated with said pattern for supporting a flask, means for actuating the pattern and flask to present the flask downwardly and suspend it from the pattern supporting means, means for supporting the flask in such position independently of the pattern support, means for permitting said pressure foot to be swung from its position over the pattern, and means for actuating the pattern support to lift the pattern from the sand in the flask.

5. A molding machine comprising a pressure foot, means for reciprocating said foot, a pattern set containing a pattern to be molded and having means for yieldingly supporting a flask, means for supporting the flask and pattern under said foot to enable said foot to compress the sand in the flask, means for permitting said pressure foot to be swung from its position over said pattern, and means for withdrawing the pattern from the sand of the flask and reprinting said pattern in the mold.

6. A molding machine comprising a pattern set containing a pattern and having means for supporting a flask, a support for the flask and pattern set, a reciprocatory foot over the pattern set for compressing the sand in the flask, the support for the flask and pattern being rotatable to enable said parts to be inverted, a table for supporting the inverted flask, means for permitting the pressure foot to be swung from its position over the pattern set, and means for actuating the support for the flask and pattern when said parts are inverted to lift the pattern from the sand of the flask and reprint said pattern therein.

7. A molding machine comprising a shaft, a pattern set secured to said shaft consisting of a pattern and means for supporting a flask, a flask upon said supporting means detachably associated with the pattern, a reciprocatory pressure foot for compressing the sand in said flask, said shaft supporting the pattern set and flask being rotatably mounted to enable the flask and pattern to be inverted, a movable support for the inverted flask, said shaft carrying the pattern set being pivotally mounted to enable its free end to be swung in the arc of a circle to withdraw the pattern from the sand and reprint it therein, and means for permitting the pressure foot to be swung out of the path of movement of the shaft and pattern set when said shaft is swinging upon its pivot.

8. A molding machine comprising laterally extending arms adapted to swing in the arc of a horizontal circle, a cylinder at the end of each of said arms, a piston in each of said cylinders, a piston rod or plunger connected with each of said pistons, a pressure foot on each of said piston rods, a support below each pressure foot, a flask and pattern on each of said supports, said flasks being adapted to confine the sand around said patterns, a common source of fluid under pressure connected to each of said cylinders, means for controlling the flow of said fluid into said cylinders to actuate said pistons and operate said pressure feet, and means for permitting said cylinders to be swung to carry said pressure feet out of alinement with the supports for the flasks and patterns.

9. A molding machine comprising a pattern set consisting of a pattern and a support for a flask, a flask upon said support for confining the sand around the pattern, a reciprocatory foot for compressing the sand in the flask, a support for the pattern set during the operation of compressing the sand, means for actuating said foot, means for adjusting said foot vertically, and means for regulating the vertical travel of said foot.

10. A molding machine comprising a shaft mounted to rotate and pivotally mounted to swing in the arc of a vertical circle, a pattern set carried by the outer end of said shaft comprising a pattern and a movably mounted embracing shell, a flask detachably mounted on said shell, and means for engaging and moving said flask for compressing the sand therein around the pattern.

11. A molding machine comprising a pattern set and means for supporting a flask to confine the sand around the pattern, a flask detachably secured to the pattern set, a shaft for supporting the pattern set and flask, means for compressing sand in the flask around the pattern, said shaft being rotatably mounted to enable the flask and pattern set to be inverted by a rotation thereof, said shaft being also pivotally mounted to swing in the arc of a vertical circle to enable the pattern to be lifted from the mold in the sand and reprinted in said mold.

12. A molding machine comprising a pattern set and means for supporting a flask to confine the sand around the pattern, a flask detachably secured to the pattern set, a shaft for supporting the pattern set and flask, means for compressing sand in the flask around the pattern, said shaft being rotatably mounted to enable the flask and pattern set to be inverted by a rotation thereof, said shaft being also pivotally mounted to swing in the arc of a vertical circle to enable the pattern to be lifted from the mold in the sand and reprinted in said mold, and a counterpoise connected with said shaft to balance the weight of the pattern set.

13. A molding machine comprising a pattern set consisting of a pattern plate and a movable shell surrounding said pattern plate, means for yieldingly supporting said shell, means for fixedly supporting the pattern plate with relation thereto, a flask mounted on said movable shell adapted to contain the molding sand, and means for forcing the flask and shell downwardly with respect to the pattern plate to compress the sand within the flask and mold the pattern therein.

14. A molding machine comprising a pattern set consisting of a pattern plate and a relatively movable shell surrounding said plate, means for yieldingly supporting said shell and for fixedly supporting the pattern plate, a flask mounted upon the shell and movable therewith adapted to confine the sand around the pattern, a movable pressure foot adapted to engage the flask and carry the flask and shell downwardly to compress the sand in the flask and imprint the pattern therein, and means for actuating said foot.

15. A molding machine comprising a pattern set consisting of a pattern plate and a relatively movable shell surrounding said plate, means for yieldingly supporting said shell and for fixedly supporting the pattern plate, a flask mounted upon the shell and movable therewith adapted to confine the sand around the pattern, a movable pressure foot adapted to engage the flask and carry the flask and shell downwardly to compress the sand in the flask and imprint the pattern therein, means for actuating said foot, and a gate carried by said foot adapted to pierce the sand in the flask and form an ingate leading to the mold.

16. A molding machine comprising a shaft mounted to rotate and to swing upon a fulcrum, a pattern set comprising a pattern plate and means for supporting a flask, said pattern set being detachably mounted on said shaft to move therewith, means for compressing the sand in the flask upon said pattern set, and means for supporting the outer end of the shaft while pressure is being applied to said sand.

17. In a molding machine the combination with means for compressing the sand in the flask, of a shaft pivotally mounted to swing in the arc of a vertical circle and journaled to rotate in said pivot, a pattern set mounted on the free end of said shaft containing a pattern plate and adapted to support a flask, and a counterpoise on the shaft for balancing the weight of the pattern set.

18. A molding machine comprising an arm pivotally mounted to swing in the arc of a horizontal circle, a cylinder at the end of said arm, a piston in said cylinder, a piston rod connected with said piston, a pressure foot connected with the piston rod, a horizontally projecting shaft mounted to rotate and pivoted to swing upon a transverse axis, a pattern set upon said shaft, and a flask upon said pattern set normally disposed below and in the path of travel of said foot.

19. A molding machine comprising a pressure foot adapted to compress the sand in a flask, a pattern set supported below said pressure foot, comprising a relatively fixed pattern plate and a relatively movable shell embracing said pattern plate, means for normally maintaining said shell in a raised position, a flask mounted upon and supported by said shell, and means for detachably securing said flask thereto.

20. A molding machine comprising a movable pressure foot, a pattern set, a shaft support for the pattern set, said pattern set comprising a hub adapted to enter upon said shaft, a pattern plate, arms supporting said plate from said hub, a movable shell embracing the pattern plate, a movable spring-restrained sleeve, and arms connecting said sleeve with said shell.

21. A molding machine comprising a movable pressure foot for compressing the sand in the flask, a gate member carried by said pressure foot, a pattern set comprising a pattern plate having the pattern mounted thereon, a gate member movably mounted in the pattern plate and projecting vertically therefrom in the path of the gate member carried by said foot, and a flask movably supported over the pattern plate adapted to recede as said pressure foot descends.

22. A molding machine having means for compressing sand in a flask, a pattern set comprising a pattern plate, a flask supported over said plate, a movable bushing projecting through the face of the pattern plate, a gate extending from said bushing to form the ingate in the sand, and means for actuating said bushing to tamp the sand around the ingate at the juncture thereof with the mold.

23. A molding machine comprising a movable pressure foot, a gate member depending from said foot, a pattern set supported below the pressure foot, said pattern set comprising a pattern plate, a flask supported above said plate, a movable bushing in the pattern plate, a movable gate member projecting from said bushing in the path of the travel of the gate member carried by the pressure foot, and means for actuating said bushing to compress the sand around the ingate at its point of juncture with the mold.

24. A molding machine comprising means for compressing the sand in the flask, a pattern set comprising a pattern plate, a flask supported above said plate, means for forming an ingate through the sand concurrent with the compression of the sand in the flask, and means for tamping the sand around the ingate at its point of juncture with the mold.

25. In a molding machine, in combination with means for compressing the sand, a pattern set comprising a pattern plate, a movable shell surrounding said plate, a flask supported on said shell, means for locking said shell when depressed, a movable gate member in the pattern plate, and means for locking said gate member in its depressed position.

26. A molding machine having a pattern set comprising a pattern plate, a flask supported above said plate, means for compressing the sand in the flask and simultaneously forming an ingate through the sand communicating with the mold, means for inverting the flask, a movable table to support said flask when inverted, and means for raising the pattern from the sand when supported on the table and reprinting the pattern in the matrix.

In testimony whereof, I sign this specification in the presence of two witnesses.

EDWARD E. O'NEILL.

Witnesses:
W. H. SADLER, Jr.,
JOHN H. PEACH.